United States Patent Office 3,174,703
Patented Mar. 23, 1965

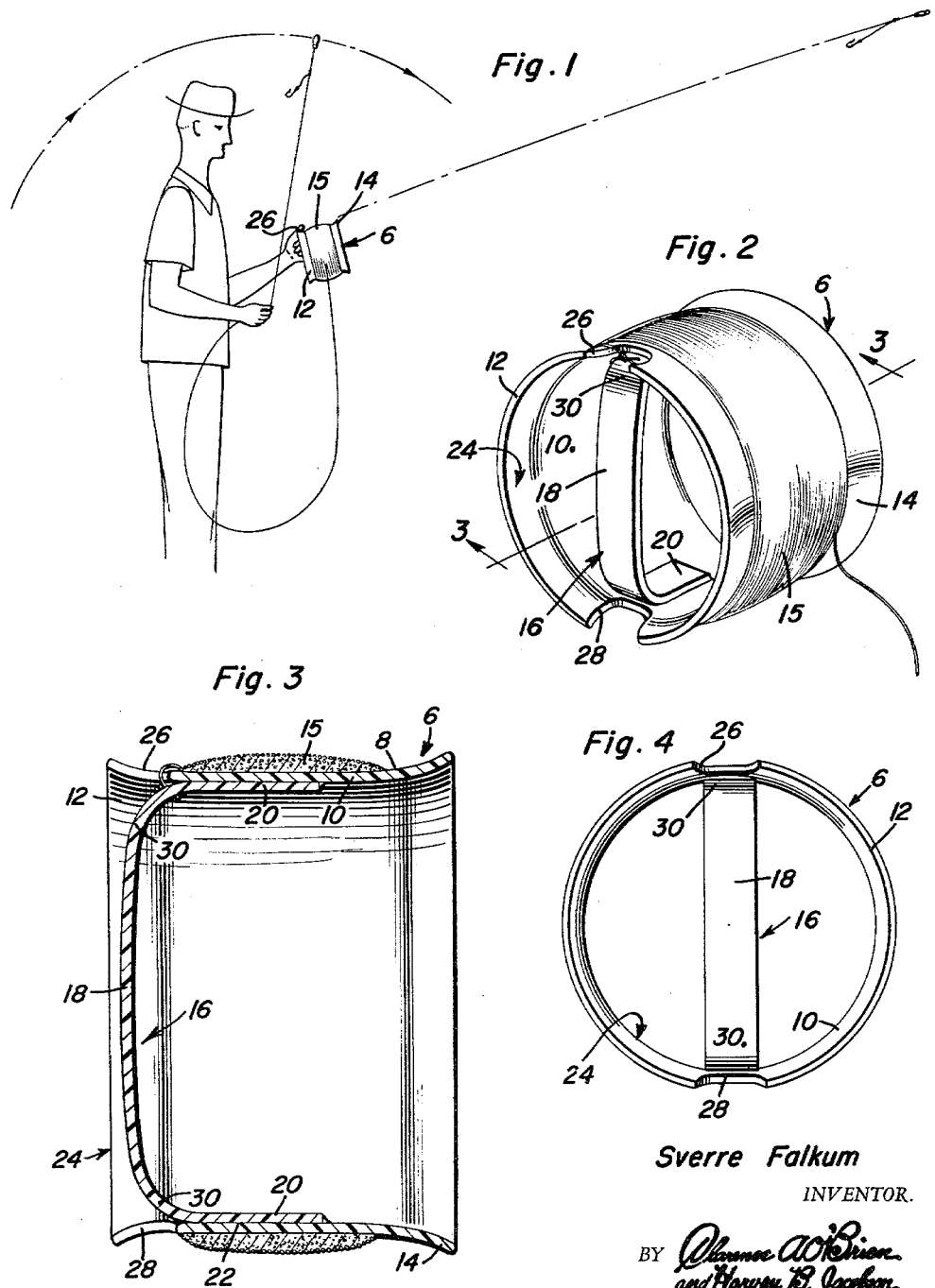

3,174,703
LINE STORING REEL
Sverre Falkum, Brooklyn, N.Y.
(574 Spur Drive N., Bay Shore, N.Y.)
Filed Oct. 17, 1963, Ser. No. 316,856
3 Claims. (Cl. 242—96)

The present invention relates to a simple, easy-to-use line storing reel whch is highly satisfactory for use when expressly designed and made for the storage thereon of a fishing line.

Briefly, the invention comprises a spool of suitable size and material, which is light in weight, practical for use by the angler who desires to use a hand line. The spool is fashioned from a simple annular band which provides a satisfactory ring-like member. The band in transverse cross-section is fashioned into a shallow endless channel by flaring the circumferential marginal edges. This channel facilitates winding the line thereon when the line is being retrieved. In addition, it facilitates spinning of the whorls off when the line is initially thrown by hand and then allowed to pay out in a generally well known manner.

One improvement resides in fashioning the spool from a simple and economical ring-like band. This band or spool is provided on the side facing the user with a handgrip.

It follows that another improvement resides in the adoption and use of a simple U-shaped strap member which has its end portions affixed to diametrically opposite inner peripheral surfaces of the band and has its bight portion bridging or spanning the adjacent open side whereby to thus provide a satisfactory handgrip.

The invention also features the provision of finger notches which are selectively usable and are located on the handgrip side and which in conjunction with the handgrip facilitates winding and reeling steps.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view showing the line storing reel on which a baited hook-equipped fishing line is stored, the reel or spool being properly held for casting the line and the free or forward end of the line being shown as it is twirled around clockwise preparatory to making a cast;

FIGURE 2 is a view in perspective of the reel illustrating the details of construction which are featured therein;

FIGURE 3 is a view on a slightly larger scale taken on the plane of the section line 3—3 of FIG. 2 looking in the direction of the arrows; and FIGURE 4 is a view in elevation observing the structure shown in FIG. 2 in a direction from left to right.

By way of introduction to the detailed description it will be noted that there are no moving parts to contend with, that the construction is such that the facilities are appropriate in size and easy to handle and grip, equally simple and such as to appeal to manufacturers, retailers and users.

Referring now to the views of the drawing the annulus, which may be of a single piece of appropriate lightweight but durable metal, wood, plastic material or the like is fashioned into a ring-like spool which is denoted as an entity by the numeral 6. More specifically the annulus comprises an annular band the outer peripheral surface of which is denoted at 8 and the inner peripheral surface at 10. The band is of endless form and is transversely dished. More specifically the band is provided with circumferential marginal flanges which are flared outwardly, said flanges denoted at 12 and 14. It follows that the thus flanged band which is slightly arcuate transversely considered provides a shallow channel which is ideally suited for winding and storing of the line 14 thereon.

The handle means is denoted at 16. It comprises a substantially U-shaped strap member having an elongated suitably curved bight portion 18 and laterally directed end portions 20 which are suitably affixed as at 22 to the inner periphery of the band. With this arrangement, that is with the bight portion across the open side denoted at 24 a highly convenient handgrip is provided, said handgrip being positioned to the right of the open side so that it is substantially within the open space in which it is confined and held. The flange 12 at the left or inwardly facing side is provided with diametrically opposite notches 26 and 28 which are in line with the handgrip and are capable of use in the manner illustrated in FIG. 1. More particularly it will be seen that the curvate or bent portion 30 of the handgrip (at either end) is in line with the notch and provides a rest. Thus the notch fittingly receives the thumb and the palmar side of the thumb rests on the bent portion. Consequently the flanged side 12 is provided with conveniently usable handling means, more specifically, the handgrip 18 for the fingers of the hand and selectively usable thumb rests with thumb confining notches associated therewith and with the notches in line with the handgrip.

It is believed that the construction of the line storing reel is such that its manner of use, especially after considering FIG. 1, will be clear. Therefore, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A storing reel for a fisherman's hand line comprising: a spool embodying and endless ring-like rim channel-shaped in cross-section, the channel of said rim being relatively shallow to facilitate winding and retention of said line thereon and also to effectually promote the spinning of the whorls of the line therefrom when the line is cast by hand, a handgrip spanning one side of the spool and encompassed by said rim, the side of said rim toward the user, the cross-section and said handgrip being narrow compared to the inside diameter of the spool to provide clearance for and to accommodate the hand and fingers of the hand so that full gripping control of the spool is assured when being used, one circumferential marginal edge of said rim being provided with at least one thumb clearance and seating notch, said notch being in alignment with the adjacent end portion of the handgrip.

2. The structure defined in claim 1 and wherein an end portion of the handgrip which is lined up with said notch being convex and providing a convenient seat for the palmar side of the thumb which is fitted into said seat.

3. A manually usable fishline storing reel comprising a substantially endless annular band having forwardly and rearwardly disposed circumferential marginal flanges, said flanges flaring gradually outwardly and defining a shallow channel-shaped line spooling and unspooling rim, the rearward flanged edge portion of said rim being provided with a pair of diametrically opposite thumb-accommodating and seating notches, said notches being selectively usable by the user's thumb, and a substantially rigid U-shaped handgrip mounted on the interior of said band and approximately shielded within the confines of the band and having terminal end portions affixed to inner peripheral surfaces of the band, junctional portions of the handgrip between the bight portion and end portions being convex and said convex surfaces being aligned with the respectively usable seating notches.

References Cited by the Examiner

UNITED STATES PATENTS

| | | | |
|---|---|---|---|
| 2,479,946 | 8/49 | Lofgreen | 242—96 |
| 2,508,809 | 5/50 | Allen | 242—96 |
| 2,812,756 | 11/57 | Myers | 242—84.1 |
| 3,006,574 | 10/61 | Hardy | 242—96 |
| 3,010,673 | 11/61 | Marconi | 242—96 |

FOREIGN PATENTS

| | | |
|---|---|---|
| 346,203 | 6/60 | Switzerland. |
| 876,785 | 5/53 | Germany. |

JORDAN FRANKLIN, *Primary Examiner.*